US010834394B2

(12) United States Patent
Toresson et al.

(10) Patent No.: US 10,834,394 B2
(45) Date of Patent: Nov. 10, 2020

(54) METHOD AND A CONTROLLER FOR ADDING COMFORT NOISE TO A VIDEO SEQUENCE

(71) Applicant: Axis AB, Lund (SE)

(72) Inventors: Alexander Toresson, Lund (SE); Viktor Edpalm, Lund (SE); Fredrik Pihl, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/224,104

(22) Filed: Dec. 18, 2018

(65) Prior Publication Data

US 2019/0200014 A1  Jun. 27, 2019

(30) Foreign Application Priority Data

Dec. 21, 2017  (EP) ..................................... 17209272

(51) Int. Cl.
| | |
|---|---|
| *H04N 19/86* | (2014.01) |
| *H04N 19/567* | (2014.01) |
| *H04N 19/117* | (2014.01) |
| *H04N 19/146* | (2014.01) |
| *H04N 19/46* | (2014.01) |
| *H04N 19/136* | (2014.01) |
| *H04N 19/172* | (2014.01) |
| *H04N 19/82* | (2014.01) |

(Continued)

(52) U.S. Cl.
CPC ......... *H04N 19/117* (2014.11); *H04N 19/136* (2014.11); *H04N 19/139* (2014.11); *H04N 19/146* (2014.11); *H04N 19/172* (2014.11); *H04N 19/177* (2014.11); *H04N 19/196* (2014.11); *H04N 19/46* (2014.11); *H04N 19/567* (2014.11); *H04N 19/82* (2014.11); *H04N 19/86* (2014.11)

(58) Field of Classification Search
CPC .... H04N 19/86; H04N 19/117; H04N 19/177; H04N 19/567; H04N 19/139
See application file for complete search history.

(56) References Cited

U.S. PATENT DOCUMENTS

| | | | |
|---|---|---|---|
| 2006/0140278 A1 | 6/2006 | Gomila et al. | |
| 2006/0171458 A1* | 8/2006 | Feng | H04N 19/176 375/240.03 |

(Continued)

FOREIGN PATENT DOCUMENTS

WO     2005/039188 A1    4/2005

OTHER PUBLICATIONS

Sasai et al., "Frame-rate up-conversion using reliable analysis of transmitted motion information," 2004 IEEE International Conference on Acoustics, Speech, and Signal Processing, Montreal, Que., pp. V-257 (2004).

*Primary Examiner* — Tsion B Owens
(74) *Attorney, Agent, or Firm* — Volpe Koenig

(57) ABSTRACT

A method of adding comfort noise to a video sequence comprising setting parameters of a deblocking filter of a video encoder to change values during the video sequence, encoding frames of the video sequence using the parameters of the deblocking filter that are set to change values during the video sequence, thereby introducing comfort noise in the video sequence, and including the encoded frames in a bitstream together with an indication of which parameters of the deblocking filter were used when encoding the frames of the video sequence.

18 Claims, 4 Drawing Sheets

(51) Int. Cl.
*H04N 19/139* (2014.01)
*H04N 19/177* (2014.01)
*H04N 19/196* (2014.01)

(56) References Cited

U.S. PATENT DOCUMENTS

| | | | |
|---|---|---|---|
| 2008/0253454 A1 | 10/2008 | Imamura et al. | |
| 2010/0278231 A1* | 11/2010 | Gutman | H04N 19/172 375/240.02 |
| 2011/0080957 A1* | 4/2011 | Pan | H04N 19/176 375/240.24 |

* cited by examiner

METHOD AND A CONTROLLER FOR ADDING COMFORT NOISE TO A VIDEO SEQUENCE

TECHNICAL FIELD

The present invention relates to the field of video. In particular it relates to a method and an associated controller for adding comfort noise to a video sequence.

BACKGROUND

Video cameras are commonly used for surveillance purposes. The scene monitored by a camera may during some periods of time include moving objects, thereby introducing motion in the video captured by the camera. During other periods of time the scene may only include stationary objects, thereby causing the video captured by the camera to lack motion, i.e., the video will be a still video.

In order to deal with the varying amount of motion in the scene, the camera may dynamically adjust its frame rate depending on the amount of motion in the scene as depicted in the frames. During periods of time when there is motion in the frames, a higher frame rate may be used compared to when there is no or little motion in the frames. For example, when there is limited or no motion in the frames, the frame rate may be as low as 1 Hz, meaning that there is only one frame per second. At such low frame rates, there will be very little temporal noise in the video. As a consequence, a user watching the video will find that it looks unnatural and frozen, and the user could start wondering if there is a hardware or software malfunction of the camera.

Another way of dealing with the varying amount of motion in the scene is to use encoding techniques where the level of compression applied by the encoder varies with the importance of the image contents. For example, portions of a video frame depicting moving objects may be encoded with a lower compression than portions of the video frame where no motion is present. In particular, the portions of the video frames where no motion is present may be coded using empty blocks, sometimes referred to as skip blocks or P-skip blocks. During time periods when there is no or a limited amount of motion in the scene, the frame will thus be encoded with a majority of empty blocks. As an empty block will show as a copy of the corresponding block in the previous frame, this will also have the effect that there is very little temporal noise in the video. Thus, again, a user watching the video will find that it looks unnatural and frozen, and the user could start wondering if there is a hardware or software malfunction with the camera.

Thus, using a low frame rate, or encoding a video using a large number of empty blocks as explained above may introduce an artificial stillness in the video due to the absence of temporal noise. This artificial stillness is not caused by the lack of motion in the scene itself, since a video of a static scene captured at a frame high rate may still include temporal noise due to noise at the sensor, but is caused by the choice of frame rate or the encoding approach used when encoding the video as explained above. In order to mitigate the artificial stillness so as to avoid that the video looks unnatural and frozen, a synthetic temporal noise, sometimes called comfort noise, may be added to the video.

One way of adding comfort noise to a video is to add noise to the images of the video at a decoder side. However, that would have as an effect that a non-standard decoder would have to be used. Another option could be to add film grain characteristics to the video at the decoder side using a parametrized model derived at the encoder and transmitted to the decoder in a film grain characteristics message as allow by the h.264 standard. However, a drawback of that option is that the bitrate of the encoded video may increase. There is thus room for improvements.

SUMMARY

Providing a way of adding comfort noise to a video sequence which is efficient in terms of bitrate and allows a standard decoder to be used would be beneficial.

According to a first aspect, a method of adding comfort noise to a video sequence, comprises:
 setting parameters of a deblocking filter of a video encoder to change values during the video sequence,
 encoding frames of the video sequence using the parameters of the deblocking filter that are set to change values during the video sequence, thereby introducing comfort noise in the video sequence, and
 including the encoded frames in a bitstream together with an indication of which parameters of the deblocking filter were used when encoding the frames of the video sequence.

Coding techniques encode video blockwise. In more detail, a frame is divided into blocks of pixels, sometimes referred to as macroblocks or coding units depending on the standard used. When the frame is encoded or decoded, the frame is scanned blockwise and the frame is encoded or decoded block by block. Since neighboring blocks may be encoded differently, this may in the end cause the blocks to be visible in the decoded frame. In order to mitigate the blockiness of the decoded frames, most coding standards of today, such as h.264 and h.265, prescribe to include a deblocking filter in the encoder and decoder. The deblocking filter may be seen as a smoothing filter that aims at smoothing out the visible boundaries between the blocks in the decoded frames.

The present disclosure varies the parameters of the deblocking filter from time to time during the video sequence, thereby introducing synthetic temporal noise in the video sequence, effectively resulting in comfort noise. For example, consider two frames which would appear as identical (these may for instance be two subsequent skip frames). By applying a deblocking filter to these two frames with different parameters of the filter, the two frames will, after filtering, appear as being slightly different. That slight difference serves to emulate a temporal noise between the frames, and a user watching those frames of the video will no longer experience that the video is frozen.

An advantage of using the deblocking filter to introduce comfort noise is that a functionality that is already present in standardized codecs may be used, meaning that no special encoder or decoder is required. For example, the method can be implemented within the framework of the h.264 standard. Further, as the deblocking filter would be used anyway (albeit with default settings), the resulting increase in bitrate is minimal.

By comfort noise is generally meant a synthetic temporal noise which is added to a video sequence to improve the user experience. The comfort noise may mitigate the artificial stillness so as to avoid that the video looks unnatural and frozen.

The frames of the video sequence may be encoded according to successive group of pictures, GOP, structures, and the parameters of the deblocking filter may be set to change values during a GOP structure. A GOP is a collection of successive frames of the video stream, and a GOP structure specifies the order in which intra-coded frames (I-frames) and inter-coded frames (P-frames, B-frames) are arranged in the GOP. A GOP structure starts with an intra-coded frame, which is followed by one or more inter-coded frames. The deblocking parameters may thus be set to change values during a GOP structure, meaning that the deblocking parameters may change values at least once between two intra-coded frames.

As mentioned above, the parameters of the deblocking filter are set to change values during the video sequence, or during a GOP structure. How often to change the settings may depend on the particular application, and may be for instance depend on the frame rate. The parameters may be set to change value more seldom as the frame rate increases and vice versa. The time instances when the parameters are set to change values are typically determined in a predefined way and do not depend on the image contents of the video stream.

For example, the parameters of the deblocking filter may be set to change values according to a predefined temporal pattern. In particular, the parameters of the deblocking filter may be set to change values according to a predefined pattern during the GOP structure. The predefined pattern may concern when to change values, such as for which frames in the GOP structure to change values. The predefined pattern may also specify the values between which the parameters of the deblocking filter should change.

In some embodiments, the parameters of the deblocking filter are set to change values between each frame of the GOP structure. This may be of particular interest in case of a low frame rate.

In other embodiments, the parameters of the deblocking filter are set to change values more seldom, which may be preferred for higher frame rates. More specifically, a rate at which parameters of the deblocking filter are set to change values may decrease with increasing frame rate of the video sequence.

The deblocking filter of the encoder and decoder are preferably synchronized, i.e. they should both use the same parameter values when encoding/decoding the same frame. For that reason, the parameter values of the deblocking filter used when encoding a frame are preferably communicated from the encoder to the decoder in one way or the other. For example, each encoded frame in the bitstream may include an indication of which parameters of the deblocking filter were used when encoding that frame. More specifically, referring to the h.264 standard, data of each encoded frame may be signaled using a Picture Parameter Set header (PPS header) followed by one or more slices of data. In the PPS header, a flag may be set to activate the deblocking filter, and the parameters of the deblocking filter used when encoding each slice of the frame may signaled in the corresponding slice header. If several slices are used per frame, the deblocking filter may accordingly take different values for different slices if desired.

The deblocking filter may be associated with different parameters. For example, the deblocking filter in h.264 is associated with a "strength" parameter and an "edge" parameter. Each of the parameters may take a number of different values. For example, the "strength" parameter of h.264 may take integer values between −3 and +3, and the "edge" parameter of h.264 may take integer values between −3 and +3. Thus, when combining the parameters, a plurality of combinations of parameter values, i.e., permutations of the parameter values, are possible. These are referred to herein as the plurality of possible parameter combinations. In h.264 there are thus 7×7=49 possible parameter combinations.

The parameters of the deblocking filter may be allowed to change to any value among the possible parameter combinations. However, it may be enough to allow the parameters of the deblocking filter to vary within a strict subset of the full plurality of possible parameter combinations. Accordingly, the deblocking filter of the encoder may have a plurality of possible parameter combinations, wherein the parameters of the deblocking filter are set such that they change values within a strict subset of the plurality of possible parameter combinations. In that way, the variability of the parameters of the deblocking filter may be controlled.

The subset of parameter combinations may be updated during the video sequence. In this way, the set of parameters may be updated regularly to, for instance, adapt the set of parameters to current properties of the video stream or to current settings of the encoder. The subset of parameter combinations may be updated for each received frame. Alternatively, the subset of parameter combinations may be updated more seldom. For example, the set of parameter combinations may be updated for each GOP structure.

When updating the subset of parameters, different factors may be taken into account. For example, when the signal-to-noise ratio currently is high, i.e., when there is little noise in the frames, even a small variation of the parameters of the deblocking filter between frames will be visible in the decoded frames, and thereby be enough to provide a comfort noise which increases the user experience. However, when the signal-to-noise ratio currently is lower, i.e., when there is more noise in the frames, a larger variation of the parameters of the deblocking filter between frames may be needed. Otherwise the added comfort noise will tend to be drowned by the noise in the frames. The subset of parameter combinations may therefore be updated based on a current signal-to-noise ratio of the video sequence. The signal-to-noise ratio may be estimated from a predetermined number of received frames. This may include estimating the signal-to-noise ratio from the last received frame, or from the last received n frames, where n is a predefined number larger than one. This may be performed for each frame or more seldom, such as once per GOP structure. In the latter case, the signal-to-noise ratio may be estimated from the first frame of the GOP structure.

Further, for the reasons explained above, it may generally be favorable to decrease the variability of the parameter combinations within the subset with increasing signal-to-noise ratio. The variability of the parameter combinations within the subset may be measured in terms of the largest distance between parameter combinations with the subset. The distance may be calculated using the L2 norm. Accordingly, the subset of parameter combinations may be updated such that a largest distance between parameter combinations within the subset decreases with increasing signal-to-noise ratio.

Alternatively, or additionally, the subset of parameter combinations may be updated based on at least one of a frame rate of the video sequence, a length of a GOP structure, and a current compression level of the video encoder. The compression level may correspond to a value of the quantization parameter as, e.g., known from h.264 and h.265.

In some cases, empty frames may be introduced, i.e., frames which only includes skip blocks, between the encoded frames. For example, a low frame rate may look strange to a user in that the display may seem to flicker at a noticeable slow rate. An approach to mitigate the flickering is to add empty frames (which may be skip frames, that is inter-coded frames with no updated data) into the video stream between each update. This will serve to increase the frame rate and thereby reduce the appearance of flickering. However, the update rate of the contents in the video since is not increased in this way since the empty frames will only show as a copy of the previous frame. According to another example, some clients only accept a constant frame rate. Thus, if a dynamically varying frame rate is used, empty frames may be included between the frames so as to emulate a constant frame rate. However, as previously explained, frames which include many skip blocks (or only skip blocks in the case of empty frames) serve to introduce an artificial stillness in the video. Therefore, in the step of encoding, empty frames may be inserted between the encoded frames, and, in the step of setting parameters of the deblocking filter, the parameters may be set to change values for the empty frames. In other words, the parameters are set to vary for the empty frames. In this way, a temporal noise is introduced in the empty frames, thereby removing the artificial stillness introduced by the empty frames.

According to a second aspect, a controller for controlling a video encoder to add comfort noise to a video sequence, comprises:

a parameter setting component configured to set parameters of a deblocking filter of a video encoder such that they change values during the video sequence, and a control component configured to instruct the video encoder to encode frames of the video sequence using the parameters of the deblocking filter that change values during the video sequence, thereby introducing comfort noise in the video sequence, and include the encoded frames in a bit stream together with an indication of which parameters of the deblocking filter were used when encoding the frames of the video sequence.

According to a third aspect, a computer program product comprising a (non-transitory) computer-readable medium having computer code instructions stored thereon adapted to carry out the method according to the first aspect when executed by a device having processing capability is set forth.

The second and third aspects may generally have the same features as the first aspect. It is further noted that the description herein relates to all possible combinations of features unless explicitly stated otherwise.

BRIEF DESCRIPTION OF THE DRAWINGS

The above, as well as other features, will be better understood through the following illustrative and non-limiting detailed description of embodiments, with reference to the appended drawings, where the same reference numerals will be used for similar elements, wherein.

DETAILED DESCRIPTION OF EMBODIMENTS

A description will be set forth more fully hereinafter with reference to the accompanying drawings, in which embodiments are shown. The systems and devices disclosed herein will be described during operation.

Figure 1:
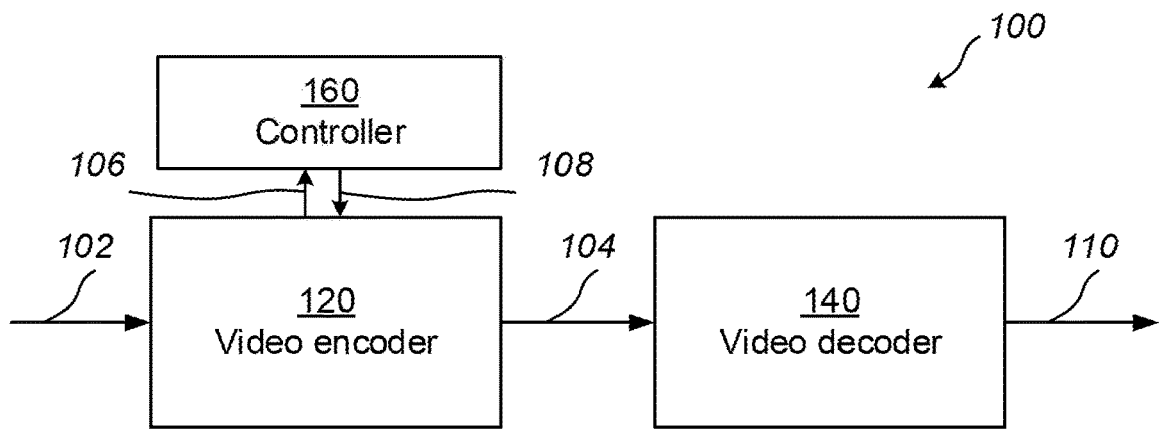
FIG. 1 schematically illustrates a system in which embodiments may be implemented.

FIG. 1 illustrates a system 100 in which example embodiments may be implemented. The system 100 comprises a video encoder 120, a video decoder 140, and a controller 160. The video encoder 120 and the video decoder 140 may implement a video coding standard, such as the h.264 or the h.265 standard, which encodes and decodes frames of a video sequence block by block. Thus a standard video encoder and a standard video decoder may be used.

During use, the video encoder 120 receives a video sequence 102, i.e., a sequence of image frames, to be encoded. The video sequence 102 may be captured by a video camera and forwarded to the video encoder 120. The video sequence 102 may be a still video sequence or a video sequence in which the motion is limited, at least for spatial or temporal portions thereof. The video encoder 120 may be included in the video camera capturing the video sequence 102. The video encoder 120 then encodes the video sequence, and includes the encoded video sequence in a bitstream 104 for transmission to the decoder 140, for instance via a wired or wireless network.

The operation of the video encoder 120 is controlled by the controller 160. The controller 160 may be separate from the video encoder 120, or may be included in the video encoder 120. Both the controller 160 and the video encoder may be included in the video camera capturing the video sequence 102. The controller 160 may receive data 106 from the video encoder 120. The data 106 may concern parameters used by the video encoder, such as a GOP structure and a compression level currently used by the video encoder 120. The compression level may be in the form of a quantization parameter. The data 106 may also relate to the video sequence 102, such as the frame rate of the video sequence. The data 106 may also include the video sequence 102 itself, or at least one or more frames thereof.

The controller 160 may send a control signal 108 to the video encoder 120 to control the operation thereof. For example, the control signal 108 may convey information to the video encoder 120 regarding which parameters of a deblocking filter to use when encoding the video sequence 102. In response, the encoder 120 encodes the video sequence 102 using the parameters of the deblocking filter conveyed from the controller 160 via the control signal 108.

The video encoder 120 may further include control information in the bitstream 104. The control information may, for instance, be included in headers of the encoded video frames. The control information may include information regarding which parameters were used by the video encoder 120 when encoding the video sequence 102. For example, the control information may include an indication regarding which parameters of a deblocking filter were used when encoding the frames of the video sequence 102.

Figure 2:
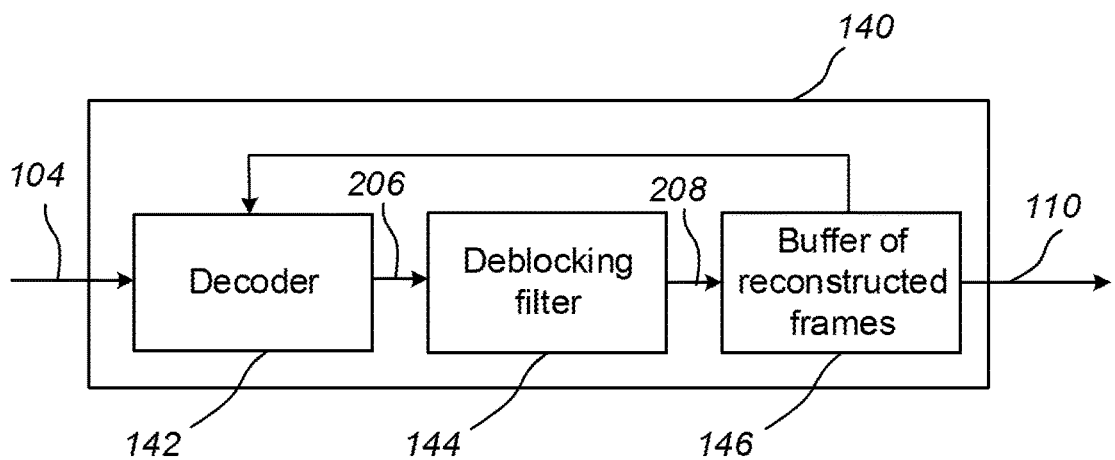
FIG. 2 schematically illustrates a video decoder.

Upon receipt of the bitstream 104, the video decoder 140 decodes the encoded frames, using the control information, to provide a reconstructed video sequence 110. This is further illustrated in FIG. 2 which shows the video decoder 140 in more detail. The video decoder 140 includes a decoder component 142, a deblocking filter 144, and a buffer of reconstructed frames 146. The decoder component 142 decodes the bitstream 104 to provide an initial reconstruction 206 of the frames of the video sequence 102. This may include scaling, inverse transformation, and intra-frame prediction or inter-frame prediction depending on whether the encoded frame was intra-coded or inter coded as known in the art. If the frame was intra-coded, it is predicted with reference to the frame itself. If the frame was inter-coded, it is predicted by making reference to previously decoded frames which are stored in the buffer of reconstructed frames 146.

The initially reconstructed frames 206 are then input to the deblocking filter 144 which filters the initially reconstructed frames 206, to provide reconstructed frames 208 which are stored in the buffer of reconstructed frames 146. The purpose of the deblocking filter 144 is to reduce blockiness in the initially reconstructed frames 206 caused by block-wise encoding of the frames. When filtering the frames, the deblocking filter 144 uses the parameters which were included by the video encoder 102 in the bitstream 104 together with the encoded frames. The reconstructed frames 208 in the buffer of reconstructed frames 146 may then be re-ordered and output in the correct display order as a reconstructed video sequence 110.

Figure 3:
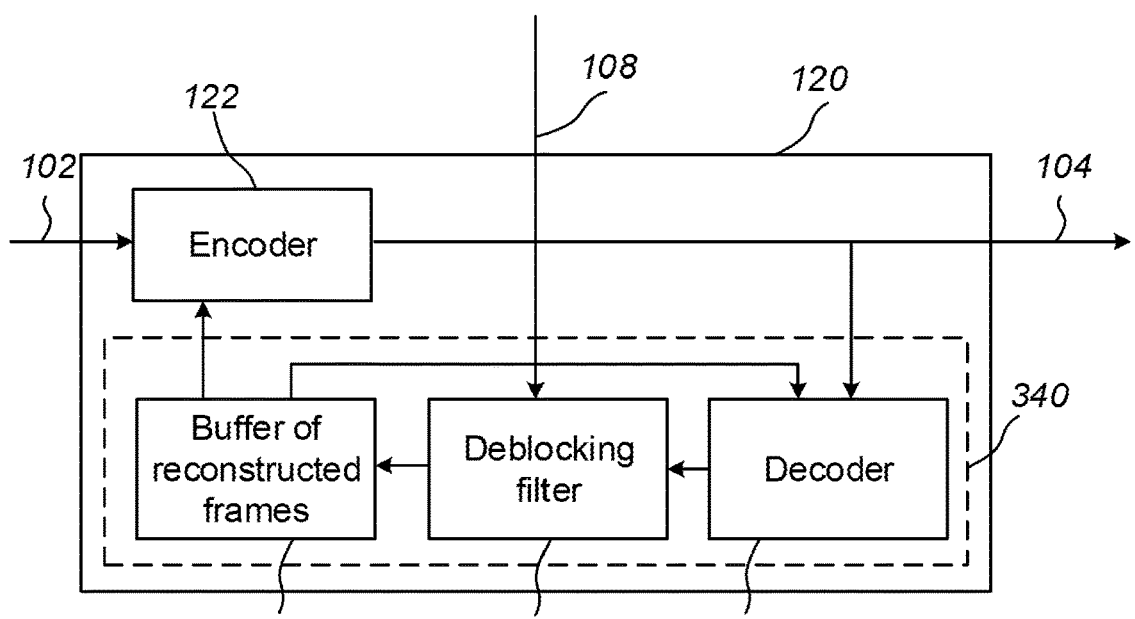
FIG. 3 schematically illustrates a video encoder.

FIG. 3 illustrates the video encoder 120 in more detail. The video encoder 120 comprises an encoder component 122. The encoder component 122 encodes the video sequence 102 frame-by-frame, and block-by-block, as known in the art. In particular, the frames may either be intra-coded or inter-coded. In the former case, a frame is encoded by only making reference to itself. In the latter case, the frame is encoded by making reference to previously decoded frames. For that purpose, the video encoder 120 includes a video decoder 340 which mimics the video decoder 140 so as to provide the previously decoded frames. In other words, the video decoder 340 operates in the same manner as the video decoder 140. In particular, the video decoder 340 included in the video encoder 120 includes a decoder component 342, a deblocking filter 344, and a buffer of reconstructed frames 346, which operate in the same way as the corresponding components in the video decoder 140. The video decoder 340 inside the video encoder 120 does not only operate in the same manner as the video decoder 140, but it is also synchronized with the video decoder 140. This means, for instance, that the video decoder 340 inside the video encoder 120 and the video decoder 140 uses the same parameters when reconstructing the same frame. In particular, the video encoder 340 inside the video encoder 120 and the video decoder 140 preferably uses the same parameters of the deblocking filter 144, 344 when reconstructing the same frame. Using different parameters in the decoder 140 would result in artifacts which would increase during the GOP until the next intra-frame. This synchronization is achieved by the control information in the bitstream 104 regarding which parameters were used by the video encoder 120 when encoding the video stream 102. For example, the control information may include an indication regarding which parameters of the deblocking filter 304 were used when encoding the frames of the video sequence 102 so that the deblocking filter 144 at the decoder side may use the same parameters.

As further mentioned above, the operation of the video encoder 120 is controlled by the controller 160 via control signal 108. In particular, the control signal 108 may provide information to the deblocking filter 344 regarding which parameters to use with respect to each frame of the video sequence 102.

Figure 4:
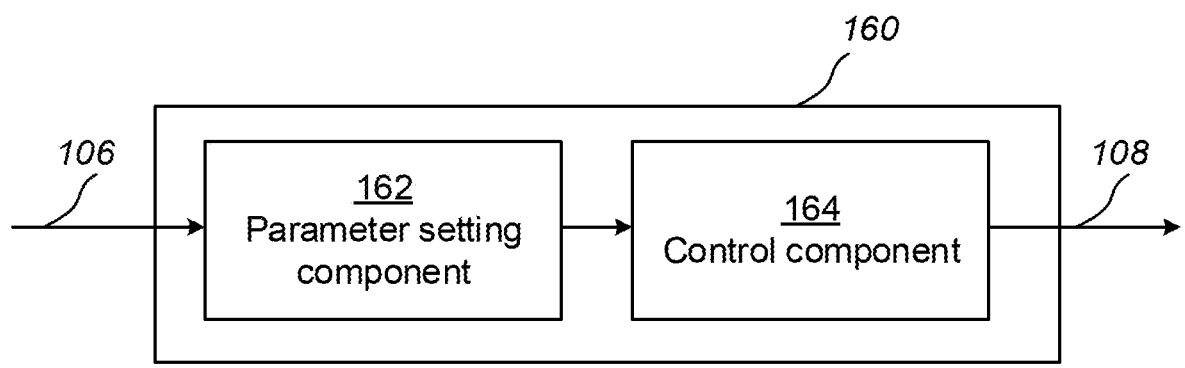
FIG. 4 schematically illustrates a controller according to embodiments.

FIG. 4 illustrates the controller 160 in more detail. The controller 160 includes a parameter setting component 162 and a control component 164.

Generally, the controller 160 may comprise circuitry which is configured to implement the components 162, 164 and, more specifically, their functionality.

In a hardware implementation, each of the components 162, 164 may correspond to circuitry which is dedicated and specifically designed to provide the functionality of the component. The circuitry may be in the form of one or more integrated circuits, such as one or more application specific integrated circuits. By way of example, the parameter setting component 162 may thus comprise circuitry which, when in use, sets parameters of the deblocking filter 344.

In a software implementation, the circuitry may instead be in the form of one or more processors, such as one or more microprocessors, which in association with computer code instructions stored on a (non-transitory) computer-readable medium, such as a non-volatile memory, causes the controller to carry out any method or relevant sub-steps thereof as disclosed herein. In that case, the components 162, 164, may thus each correspond to a portion of computer code instructions stored on the computer-readable medium, that, when executed by the processor, causes the controller 160 to carry out the functionality of the component.

It is to be understood that it is also possible to have a combination of a hardware and a software implementation, meaning that the functionality of some of the components 160, 162 are implemented in hardware and others in software.

What was said above with respect to the implementation of the components 162, 164 of the controller 160 applies equally well to the components of the video encoder 120 and the video decoder 140. In particular, it applies to components 122, 342, 344 of the video encoder 120, and to components 142, 144 of the video decoder 140. The buffer of reconstructed frames 146, 346 may be implemented in terms of a memory.

Figure 7:
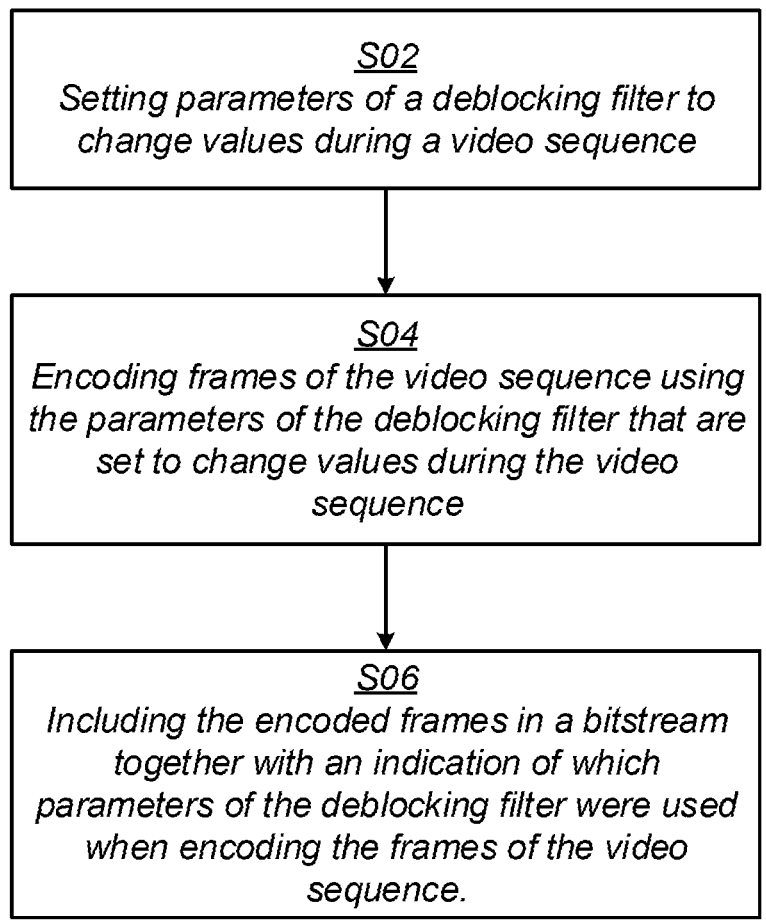
FIG. 7 is a flow chart of a method of adding comfort noise to a video sequence according to embodiments.

A method for adding comfort noise to a video sequence will now be described with reference to FIGS. 1-4, 5a, 5b and the flow chart of FIG. 7. The method may be applied to any video sequence. In particular, it may be applied to still video sequences and video sequences in which there is a limited amount of motion (the level of motion is below a threshold), at least for spatial and/or temporal portions thereof.

In step S02, the parameter setting component 162 of the controller 160 sets parameters to be used by the deblocking filter 344 of the video encoder 120 when encoding the video sequence 102. The parameters which are available may, for instance, be specified by a video coding standard. For example, the parameters may include a strength parameter and an edge parameter, which are the parameters of the deblocking filter of the h.264 standard. The parameter setting component 162 may set the parameters of the deblocking filter on a frame-by-frame basis. In particular, when doing so, the parameter setting component 162 sets the parameters of the deblocking filter 344 to change values during the video sequence 102. In other words, the parameters of the deblocking filter 344 are set such they vary during the video sequence 102.

The parameter setting component 162 may, in particular change values of the parameters during periods when the level of motion in the video sequence 102 is below a certain threshold, since the need of adding comfort noise may be larger when the level of motion in the video sequence 102 is low. During other periods, when the level of motion is above the threshold, the parameter setting component 162 may keep the parameters of the deblocking filter 344 constant.

The video encoder 120 may encode the video sequence 102 according to successive GOP, structures. A GOP structure defines the order in which intra-coded frames (sometimes referred to as I-frames) and inter-coded frames (sometimes referred to as P-frames and B-frames) are arranged in the GOP. A GOP structure typically starts with an intra-coded frame, and is followed by one or more inter-coded frames, as illustrated by the GOP structure 510 in FIG. 5*a*, where an intra-frame ("I") is followed by five inter-coded frames ("P") in the GOP structure 510.

The parameter setting component 162 may set the parameters of the deblocking filter 344 to change values during the GOP structure 510. In other words, the parameters of the deblocking filter 244 may vary during the GOP structure 510. For instance, the parameter setting component may set the parameters of the deblocking filter 344 to change values one or more times during the GOP structure 510.

Figure 5A:
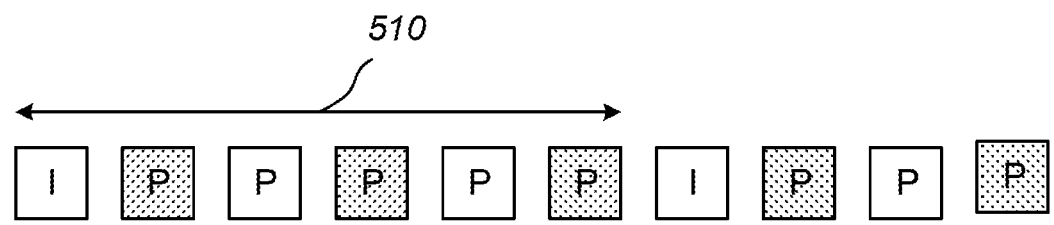
FIGS. 5a and 5b schematically illustrate an encoded video sequence.

The parameters may be set such that they change values in a predefined manner. For example, the parameters may change values according to a predefined pattern. In particular, the parameters may be set to change values at time instants which follow a predefined pattern. The predefined pattern may specify that the parameters should change values at regular time intervals, such as between each frame, or between every second frame of the video sequence 102. The parameter setting component 162 may set the rate at which the parameters change values based on the frame rate of the video sequence 102. As the frame rate of the video sequence 102 increases, the parameter setting component 162 may decrease the rate at which the parameters are set to change values. For example, if the frame rate increases with a factor of m, the rate at which the parameters change values may be reduced by the same factor m. In the example of FIG. 5*a*, the parameters of the deblocking filter are set to change values at every second frame, namely for the frames which are marked by the dotted pattern. However, the predefined pattern may also be irregular, meaning that the parameters are set to change values at irregular time intervals, but still according to a predefined rule. The predefined pattern may be the same for all GOP structures, but it is also possible for the predefined pattern to change between GOP structures. For example, the parameter setting component 162 may switch between a number of predefined patterns between successive GOP structures.

Figure 5B:
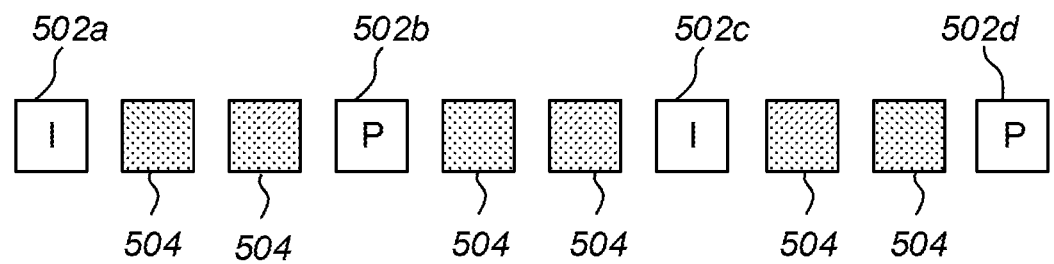

As previously discussed, the video encoder 120 may include empty frames between the encoded frames. This is further illustrated in FIG. 5*b* where the encoded video sequence includes frames 502*a*, 502*b*, 502*c*, 502*d*. The video encoder 120 includes empty frames 504 between frames 502*a*, 502*b*, 502*c*, 502*d* to, for instance, achieve the same frame rate as in FIG. 5*a*. The empty frames may be considered as a P-frame with no updated data, sometimes referred to as a P-skip frame. Such a frame, will upon decoding be a copy of the previously decoded frame and the empty frames thus introduces artificial stillness in the video sequence. In order to mitigate the introduced artificial stillness, the parameter setting component 162 may set the parameters of the deblocking filter 344 such that they change values for the empty frames 504 as illustrated in FIG. 5*b*. In that way, a temporal noise will be emulated between the empty frames as they will no longer be identical to the previously decoded frame due to being filtered with deblocking filters having different filter parameters.

The parameter setting component 162 does not only determine when during the video sequence 102, or during a GOP structure thereof, to change the parameter values of the deblocking filter 344, but it also sets the specific values of the parameters of the deblocking filter 344 to be used for each frame.

Figure 6:
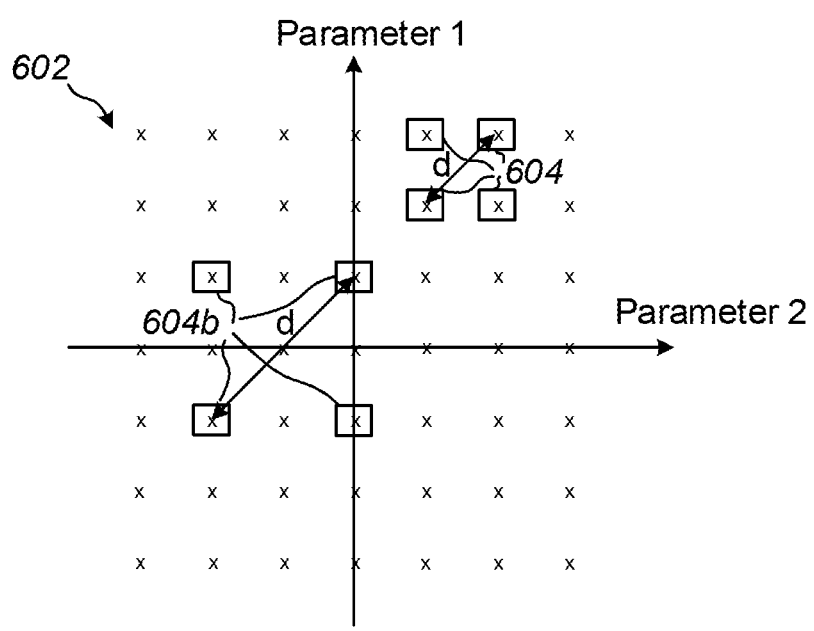
FIG. 6 schematically illustrates possible parameter combinations of a deblocking filter.

The deblocking filter 344 may be associated with a plurality of different parameters which each may take a plurality of different values. When the parameters are looked upon in combination, there will thus be a plurality of possible parameter combinations to choose from. FIG. 6 illustrates an example where the deblocking filter 344 is associated with two parameters. These parameters may, for instance, correspond to the strength and the edge parameter of the deblocking filter of the h.264 standard. Each of the illustrated first and second parameters may take a plurality of values, say M values for the first parameter and N values for the second parameter. For instance, the strength parameter and the edge parameter of h.264 may both take seven values. When the first and the second parameter are combined, there will thus be M×N possible combinations 602 of parameter values, each indicated by an "X" in FIG. 6. For the h.264 case there are thus 49 possible combinations of parameter values to make. If it is further taken into account that the deblocking filter 344 may be turned off, this increases the number of possible parameter combinations of the deblocking filter 344 by one.

When the parameter setting component 162 sets the parameters of the deblocking filter 344, it may thus choose from all possible combinations 602 of parameter values. Generally, the parameter setting component 162 may choose to set the parameters such that they change values within a set 604 of possible combinations of parameter values. The set may correspond to all possible combinations 602 of parameter values, or the set may be restricted to a strict subset of all possible combinations of parameter values as illustrated in FIG. 6. Once the parameter selecting component 162 has selected the set 604, it may change the parameter combinations within the set at random or in a deterministic manner, i.e., by following a predefined pattern. The parameter setting component 162 may select and use the same set 604 for the whole video sequence 102. Alternatively, the parameter setting component 162 may update the set 604 during the video sequence 102. The parameter setting component 162 may update the set 604 for each frame or more seldom. For example, the set 604 may be updated each GOP structure. The rate at which the set 604 is updated may also be related to the frame rate of the video sequence 102. In particular, the set 604 may be updated more seldom as the frame rate increases.

The parameter setting component 162 does typically not select or update the set 604 of parameter combinations blindly, but may make use of data 106 received from the video encoder 120 for that purpose.

As explained above, the data 106 may include the video sequence 102 itself, or at least one or more frames thereof. The set 604 may hence be selected or updated on basis of information in the video sequence 102. For example, the set 604 may be updated based on a signal-to-noise ratio, SNR, of the video sequence 102, such as the SNR of the video sequence at the moment when the set 604 is to be updated. The parameter setting component 162 may estimate the SNR from the current frame, or from the last n frames. In the case where the set 604 is updated for each GOP structure, the set 604 may for instance be updated based on a SNR of the first frame, i.e., the intra-frame, in the GOP structure. When the SNR is high, i.e., there is little noise in the video sequence 102, the parameter setting component 162 may select the set 604 such that the parameter combinations included therein are fairly similar, i.e., the variability of the parameter combinations within the set is low. Conversely, when the SNR is lower and there is more noise in the video sequence 102, the parameter setting component 162 may select the set 604 such that the variability of the parameter combinations within the set 604 is larger. The variability may, for instance, be measured in terms of the largest distance shown as "d" in FIG. 6 between parameter combinations in the set 604. Accordingly, the variability in the set 604 of FIG. 6 is smaller than in the set 604b. The parameter setting component 162 may thus update the set 604 such that the largest distance d between parameter combinations within the set decreases with increasing SNR.

Additionally, or alternatively, the data 106 may concern parameters used by the video encoder 102, such as a GOP structure and a compression level currently used by the video encoder 120. The data 106 may further relate to the video sequence 102, such as the frame rate of the video sequence. Accordingly, the parameter setting component 162 may select or adjust the set 604 based on the frame rate of the video sequence 102, the length of the GOP structure, and/or the compression level of the video encoder 102. For instance, the set 604 may be adjusted such that the largest distance d decreases with increasing value of the quantization parameter. For this purpose, the setting of the quantization parameter used when encoding the most recently encoded frame may be used. As the quantization parameter may vary locally between different blocks in the frame, a representative value of the quantization parameter may be used. The representative value of the quantization parameter may be chosen such that a predetermined value of the blocks is encoded with a quantization parameter above the representative value. In the evaluation of the representative value of the quantization parameter, skip blocks may be disregarded.

Once the parameter setting component 162 has set the parameters of the deblocking filter 344, the control component 164 generates a control signal 108 which is transmitted to the video encoder 120. The control component 164 may for example generate a control signal 108 which on a frame-by-frame basis indicates to the video encoder 120 which parameter values of the deblocking filter 344 to use. Thereby, by using the control signal 108, the controller 160 instructs the video encoder 120 to encode frames of the video sequence 102 using the parameters of the deblocking filter 344 that were set by the parameter setting component 162 of the controller 160 to change values during the video sequence 102.

Upon receipt of the control signal 108, the video encoder 120 proceeds to encode frames of the video sequence 102. When doing so, the video encoder 120 uses the parameters of the deblocking filter 344 that were indicated in the control signal 108, i.e., the parameters that were set by the parameter setting component 162. As the parameter setting component 162, as explained above, sets the parameters of the deblocking filter 344 to change values during the video sequence 102, the video encoder 120 will thus encode the video sequence 102 by using parameters of the deblocking filter that change values during the video sequence 102. Thereby, temporal noise—comfort noise—is introduced in the video sequence 102.

In step S06, the video encoder 102 proceeds to include the encoded frames into the bitstream 104. In order to keep the deblocking filter 144 on the decoder side synchronized with the deblocking filter 344 on the encoding side, the video encoder 120 further includes in the bitstream 104 an indication of which parameters of the deblocking filter were used when encoding the frames of the video sequence 102. This indication in the bitstream 104 may be provided using a header of each of the encoded frames. Following the h.264 standard, a SPS header is sent at the start of a GOP. In the SPS header, information about width and height of the frames are provided. The SPS header is followed by image data in the form of a PPS header and one or more slices for each frame. In the PPS header, a flag may be set to enable the deblocking filter. If the deblocking filter is enabled for a frame, the parameters of the deblocking filter are included in the slice header of the one or more slices of the frame. Accordingly, the parameter combination of the deblocking filter 344 that was used when encoding a frame may be signalled using headers being associated with that encoded frame.

It will be appreciated that a person skilled in the art can modify the above-described embodiments in many ways and still use the advantages as shown in the embodiments above. For example, if the video encoder and decoder comprises multiple deblocking filters, the above method may be applied by changing the parameter values of one or both filters during the video sequence. Further, the above applied equally well regardless of the number of parameters of the available deblocking filter(s). Thus, the description should not be limited to the shown embodiments but should only be defined by the appended claims. Additionally, as the skilled person understands, the shown embodiments may be combined.

The invention claimed is:

1. A method of encoding a video sequence, comprising:
setting parameters of a deblocking filter of a video encoder to change values during the video sequence;
encoding frames of the video sequence using the parameters of the deblocking filter that are set to change values during the video sequence; and
including the encoded frames in a bitstream together with an indication of which parameters of the deblocking filter were used when encoding the frames of the video sequence;
wherein, in the encoding, skip frames are inserted between encoded frames of the video sequence, and
in the setting parameters of the deblocking filter, the parameters of the deblocking filter are set to change values for the skip frames such that different parameters of the deblocking filter are applied to two subsequent skip frames.

2. The method of claim 1, wherein the frames of the video sequence are encoded according to successive group of pictures (GOP) structures, and the parameters of the deblocking filter are set to change values during a GOP structure.

3. The method of claim 2, wherein the parameters of the deblocking filter are set to change values according to a predefined pattern during the GOP structure.

4. The method of claim 2, wherein the parameters of the deblocking filter are set to change values between each frame of the GOP structure.

5. The method of claim 1, wherein a rate at which parameters of the deblocking filter are set to change values decreases with increasing frame rate of the video sequence.

6. The method of claim 1, wherein each encoded frame in the bitstream includes an indication of which parameters of the deblocking filter were used when encoding that frame.

7. The method of claim 1, wherein the deblocking filter of the encoder has a plurality of possible parameter combinations, wherein the parameters of the deblocking filter are set such that they change values within a strict subset of the plurality of possible parameter combinations.

8. The method of claim 7, wherein the subset of parameter combinations is updated during the video sequence.

9. The method of claim 8, wherein the subset of parameter combinations is updated based on a current signal-to-noise ratio of the video sequence.

10. The method of claim 9, wherein the subset of parameter combinations is updated such that a largest distance between parameter combinations within the subset decreases with increasing signal-to-noise ratio.

11. The method of claim 8, wherein the subset of parameter combinations is updated based on at least one of a frame rate of the video sequence, a length of a GOP structure, and a current compression level of the video encoder.

12. The method of claim 8, wherein the frames of the video sequence are encoded according to successive GOP structures, and wherein the set of parameter combinations is updated for each GOP structure.

13. A controller for encoding a video sequence, comprising:
a parameter setting component configured to set parameters of a deblocking filter of a video encoder to change values during the video sequence; and
a control component configured to instruct the video encoder to encode frames of the video sequence using the parameters of the deblocking filter that change values during the video sequence, and include the encoded frames in a bit stream together with an indication of which parameters of the deblocking filter were used when encoding the frames of the video sequence;
wherein the control component is configured to insert skip frames between encoded frames of the video sequence, and
the parameter setting component is configured to set the parameters of the deblocking filter such that different parameters of the deblocking filter are applied to two subsequent skip frames.

14. A computer program product comprising a non-transitory computer-readable storage medium having computer code instructions stored thereon adapted to carry out the method of encoding a video sequence, when executed by a device having processing capability, comprising:
setting parameters of a deblocking filter of a video encoder to change values during the video sequence;
encoding frames of the video sequence using the parameters of the deblocking filter that are set to change values during the video sequence; and
including the encoded frames in a bitstream together with an indication of which parameters of the deblocking filter were used when encoding the frames of the video sequence;
wherein, in the encoding, skip frames are inserted between encoded frames of the video sequence, and
in the setting parameters of the deblocking filter, the parameters of the deblocking filter are set to change values for the skip frames such that different parameters of the deblocking filter are applied to two subsequent skip frames.

15. The controller of claim 13, wherein the frames of the video sequence are encoded according to successive group of pictures (GOP) structures, and the parameters of the deblocking filter are set to change values during a GOP structure.

16. The controller of claim 13, wherein a rate at which parameters of the deblocking filter are set to change values decreases with increasing frame rate of the video sequence.

17. The controller of claim 13, wherein the deblocking filter of the encoder has a plurality of possible parameter combinations, wherein the parameters of the deblocking filter are set such that they change values within a strict subset of the plurality of possible parameter combinations.

18. The computer program product of claim 14, wherein the frames of the video sequence are encoded according to successive group of pictures (GOP) structures, and the parameters of the deblocking filter are set to change values during a GOP structure.

* * * * *